United States Patent
Lu et al.

(10) Patent No.: US 9,704,510 B2
(45) Date of Patent: Jul. 11, 2017

(54) DATA WRITER WITH GRADED SIDE SHIELDS

(71) Applicant: Seagate Technology LLC, Cupertino, CA (US)

(72) Inventors: Lei Lu, Bloomington, MN (US); Kirill Rivkin, Edina, MN (US); Xuelian Xu, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/863,673

(22) Filed: Sep. 24, 2015

(65) Prior Publication Data
US 2017/0092300 A1   Mar. 30, 2017

(51) Int. Cl.
*G11B 5/11* (2006.01)
*G11B 5/115* (2006.01)
*G11B 5/31* (2006.01)
*G11B 5/127* (2006.01)

(52) U.S. Cl.
CPC ............... *G11B 5/115* (2013.01); *G11B 5/11* (2013.01); *G11B 5/112* (2013.01); *G11B 5/1278* (2013.01); *G11B 5/315* (2013.01)

(58) Field of Classification Search
CPC ....... G11B 5/11; G11B 5/1278; G11B 5/3146; G11B 5/315
USPC .................................................... 360/125.3
See application file for complete search history.

(56) References Cited

U.S. PATENT DOCUMENTS

| | | | |
|---|---|---|---|
| 8,149,537 B2 | 4/2012 | Nazarov | |
| 8,277,669 B1 | 10/2012 | Chen et al. | |
| 8,351,305 B2 | 1/2013 | Zhou et al. | |
| 8,400,731 B1 | 3/2013 | Li et al. | |
| 8,542,463 B2 | 9/2013 | Guan | |
| 8,570,686 B2 | 10/2013 | Hosomi et al. | |
| 8,582,238 B1 * | 11/2013 | Liu ..................... | G11B 5/1278 360/125.3 |
| 8,724,259 B1 * | 5/2014 | Liu ..................... | G11B 5/1278 360/125.15 |
| 8,830,626 B2 | 9/2014 | Heim et al. | |
| 8,929,029 B2 | 1/2015 | Min et al. | |
| 9,214,165 B1 * | 12/2015 | Liu ..................... | G11B 5/11 |
| 9,361,912 B1 * | 6/2016 | Liu ..................... | G11B 5/187 |
| 2010/0321835 A1 * | 12/2010 | Zhang ................. | G11B 5/3116 360/319 |
| 2011/0075294 A1 * | 3/2011 | Fuchizaki ............ | G11B 5/1278 360/123.12 |
| 2011/0116195 A1 * | 5/2011 | Cazacu ................ | G11B 5/193 360/319 |
| 2012/0250189 A1 * | 10/2012 | Degawa .............. | G01R 33/093 360/235.4 |
| 2012/0281319 A1 * | 11/2012 | Singleton ........... | G01R 33/093 360/319 |

(Continued)

*Primary Examiner* — Jefferson Evans
(74) *Attorney, Agent, or Firm* — Hall Estill Attorneys at Law

(57) ABSTRACT

A data writer can have at least a write pole separated from first and second side shields by a continuous dielectric gap layer. Each side shield may have first and second shield sub-layers configured with different magnetic moments that increase relative to the sub-layer's distance from the write pole. The side shields may wrap around a leading tip of the write pole to form a box shield.

19 Claims, 4 Drawing Sheets

(56) References Cited

U.S. PATENT DOCUMENTS

| | | | | |
|---|---|---|---|---|
| 2014/0063657 A1* | 3/2014 | Gao | ................ | G11B 5/1278 360/119.02 |
| 2014/0153133 A1* | 6/2014 | Heim | ................ | G11B 5/3116 360/125.03 |
| 2014/0169146 A1* | 6/2014 | Yin | ................ | G11B 5/1278 369/13.33 |
| 2014/0293474 A1* | 10/2014 | Yamane | ............ | G11B 5/3932 360/75 |
| 2015/0002959 A1 | 1/2015 | Basu et al. | | |
| 2015/0085402 A1* | 3/2015 | Bashir | ................ | G11B 5/3116 360/235.4 |
| 2015/0103445 A1 | 4/2015 | Xue et al. | | |
| 2015/0199983 A1* | 7/2015 | Mooney | ............ | G11B 5/265 360/235.4 |
| 2015/0248903 A1* | 9/2015 | Aoyama | ............ | G11B 5/398 360/99.08 |
| 2015/0279416 A1* | 10/2015 | Tabata | ........... | G11B 20/10212 369/13.22 |
| 2016/0064017 A1* | 3/2016 | Basu | ................ | G11B 5/11 360/128 |

\* cited by examiner

DATA WRITER WITH GRADED SIDE SHIELDS

SUMMARY

A data writer, in accordance with various embodiments, has a write pole separated from first and second side shields by a continuous dielectric gap layer. Each side shield has first and second shield sub-layers configured with different magnetic moments that increase relative to the sub-layer's distance from the write pole.

DETAILED DESCRIPTION

Various embodiments provide a data writer side shield structure that increases the writeability and reduce the risk of data erasure conditions by grading the magnetic moment of portions of the side shield. To provide greater data capacity, the data density of a data storage device is increased. Such increased magnetic recording areal data density corresponds with large write fields that can result in data erasure along a common track (on-track) and adjacent tracks (off-track) inadvertently manipulate programmed data.

In data writer portions of a data storage device, magnetic side shields can increase lateral write field gradient while reducing fringing fields from a write pole, which helps increase recording track density. However, there are also two other effects from the magnetic side shields that will affect the recording performance. First, positioning a magnetic shield close to a write pole can increase unwanted magnetic shunting, which decreases the write pole's write field amplitude and on-track field gradient. Second, shunted magnetic flux can saturate the side shield and create magnetic domain patterns that can generate strong side shield erasure conditions that result in large bit error rate degradation. Hence, data writer shielding configurations that allow for increased data density while mitigating inadvertent shunting is a continued goal to optimize data writer writeability in perpendicular recording environments.

Figure 1:
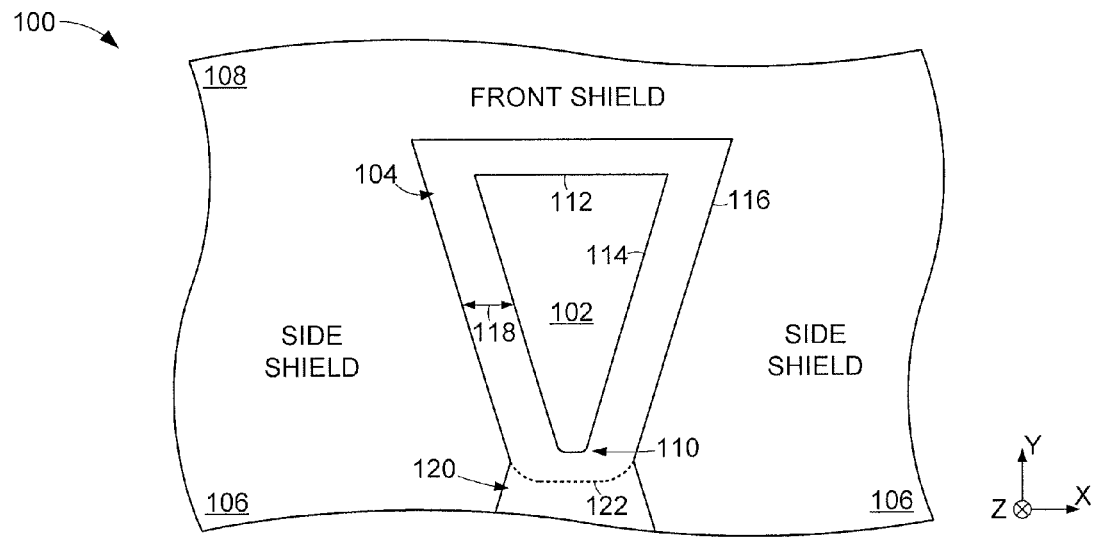
FIG. 1 is an air bearing view line representation of a portion of an example data writer constructed in accordance with various embodiments.

In FIG. 1, an air bearing view line representation of a portion of an example data writer 100 is displayed. The data writer 100 is configured in accordance with various embodiments to have a write pole 102 surrounded by a non-magnetic gap material 104 that separates the write pole 102 laterally from side shields 106 and vertically from a front shield 108. It is noted that the orientation of the side shields 106 can be characterized as cross-track and the front shield 108 can be characterized as downtrack from the write pole 102, but such characterization is relative to the direction of travel of the write pole with respect to a data track of a data storage device separated from the data writer 100 by an air bearing.

The write pole 102 may have any size and shape on the air bearing surface (ABS). The trapezoidal shape of the write shown in FIG. 1 is configured to position a pole tip 110 with a smaller cross-track width uptrack from a trailing edge 112 that has a greater cross-track width. Despite the presence of the non-magnetic gap material 104, unwanted shunting and shield magnetic saturation may occur, especially when the overall size of the data writer 100 is decreased to accommodate increased data density environments.

Increasing the amount of non-magnetic gap material proximal portions of the write pole 102 may reduce the risk of shunting. For instance, the orientation of the write pole sidewall 114 can be different than the side shield sidewall 116 to position more non-magnetic gap material proximal the trailing edge 112 while providing a small shielding gap proximal the leading tip 110. That is, the distance 118 from the write pole 102 to the side shield 106 can be uniform or varying along the Y axis and the uptrack direction to position magnetic material closer to, or farther away from the write pole 102.

In some embodiments, each side shield 106 extends uptrack from pole tip 110 and defines a non-magnetic leading gap 120 while other embodiments continuously wrap the side shields 106 around the pole tip 110, as illustrated by segmented line 122. The ability to configure the amount and position of non-magnetic material proximal the write pole 102 can mitigate some shunting. However, demand for increasing write pole 102 write field amplitude and gradients has stressed the shielding configuration of FIG. 1 and increased the risk of erasure conditions and adjacent track interference (ATI).

It is noted that configuring a side shield with a single magnetic moment can correspond with large write field loss despite cross-track field gradient increases. Accordingly, assorted embodiments mitigate erasure risk and optimize writeability with a data writer arranged with a write pole separated from first and second side shields by a continuous dielectric gap layer with each side shield having first and second shield sub-layers configured with different magnetic moments that increase relative to the sub-layer's distance from the write pole.

Figure 2:
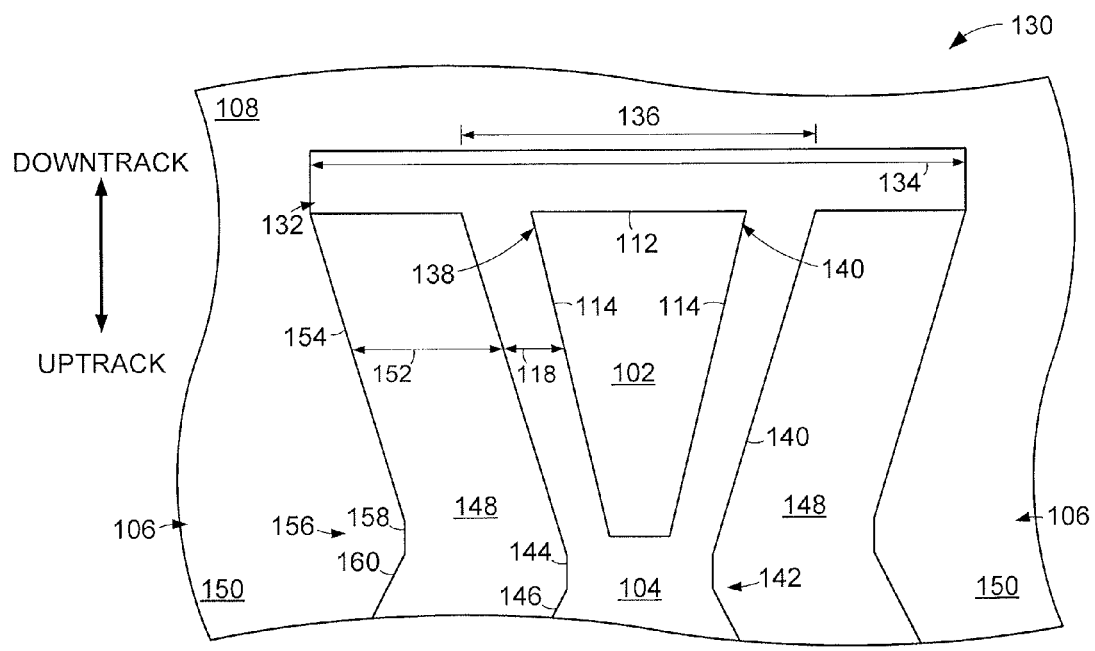
FIG. 2 shows an air bearing view line representation of a portion of an example data writer fabrication system configured in accordance with some embodiments.

FIG. 2 displays an air bearing line representation of a portion of an example data writer 130 configured to optimize data writing performance in accordance with various embodiments. An increased amount of non-magnetic gap material is positioned between the write pole 102 and the front shield 108 by positioning a letterbox notch 132 downtrack of the write pole 102. As shown, the letterbox notch 132 continuously extends cross-track with a width 134 that is greater than the collective width 136 of the write pole 102 and non-magnetic gap 104. The letterbox notch 132 is aligned with the trailing edge 112 of the write pole 102 so that the side shields 106 each continuously extend up to a plane aligned with the trailing edge 112. That is, the letterbox notch 132 extends no farther uptrack than a plane aligned with the trailing edge 112 of the write pole 102.

It is contemplated that increased amounts of non-magnetic material can be positioned proximal opposite corners 138 and 140 of the write pole 102 by configuring the side shield sidewall 142 with a different angular orientation than the write pole sidewall 114. The varying gap distance 118 provided by the differing sidewall angular orientations position the side shields 106 closer to the pole tip 110 than the respective pole corners 138 and 140. The decreased gap distance 118 proximal the pole tip 110 can correspond with an uptrack shield feature 144 that is shaped to provide a balance between shielding of stray fields and decreasing the risk of unwanted shunting from the pole tip 110.

The uptrack shield feature 144 can be defined by any number of linear or curvilinear surfaces, but has vertical 146 and sloped 148 sidewalls in FIG. 2. The vertical sidewall 146 is arranged parallel to the Y axis and downtrack direction to provide shielding material immediately uptrack from the pole tip 110 while the sloped sidewall 148 is angled with respect to the Y axis to increase the amount of non-magnetic gap material between the side shields 106. Although tuning the shape, size, and position of the shield feature 144 can increase data writer 130 writeability, the risk of shunting and shield saturation remains high. Hence, the side shields 106 are each configured with graded magnetic moment materials that gradually decrease the magnetic moment of the shields 106 relative to the position relative to the write pole 102.

In the non-limiting example of FIG. 2, each side shield 106 has a first shield sub-layer 148 that has a lower magnetic moment than a second side shield sub-layer 150. The decreased magnetic moment of the first sub-layer 148 lowers the write flux reduction of a single, fixed, magnetic moment side shield 106. Tuning of the respective sub-layers 148 and 150 can increase a peak perpendicular write field, such as by approximately 0.6%, reduce static erasure fields, such as by approximately 3.3%, and reduce dynamic erasure fields, such as by approximately 20%, which decreases the risk of erasure conditions and ATI.

Although not required, the first shield sub-layer 148 has a cross-track width 152 that aligns the first sub-layer material with a cross-track boundary of the letterbox notch 132. The first 148 and second 150 sub-layers can be constructed of similar, or dissimilar, materials that are separated by a side shield seam 156. The side shield seam 156 can be configured to provide a seam feature 158 that has vertical 160 and sloped 162 seam sidewalls that operate similarly to the shield feature 144, but at a downtrack position relative to the shield feature 144. That is, the seam feature 158 is positioned downtrack from the shield feature 144 with the vertical seam sidewall 160 aligned with the pole tip 110 along the X axis in the cross-track direction.

The combination of the smaller sub-layer magnetic moment proximal the write pole 102 with the shield 144 and seam 158 features allows the side shields 106 to be tuned to provide a balance between shielding the write pole 102, maintaining high write field amplitude and gradient, and mitigating the risk of erasure conditions and ATI. It is noted that any number of side shield sub-layers and materials can be utilized, without limitation.

Figure 3:
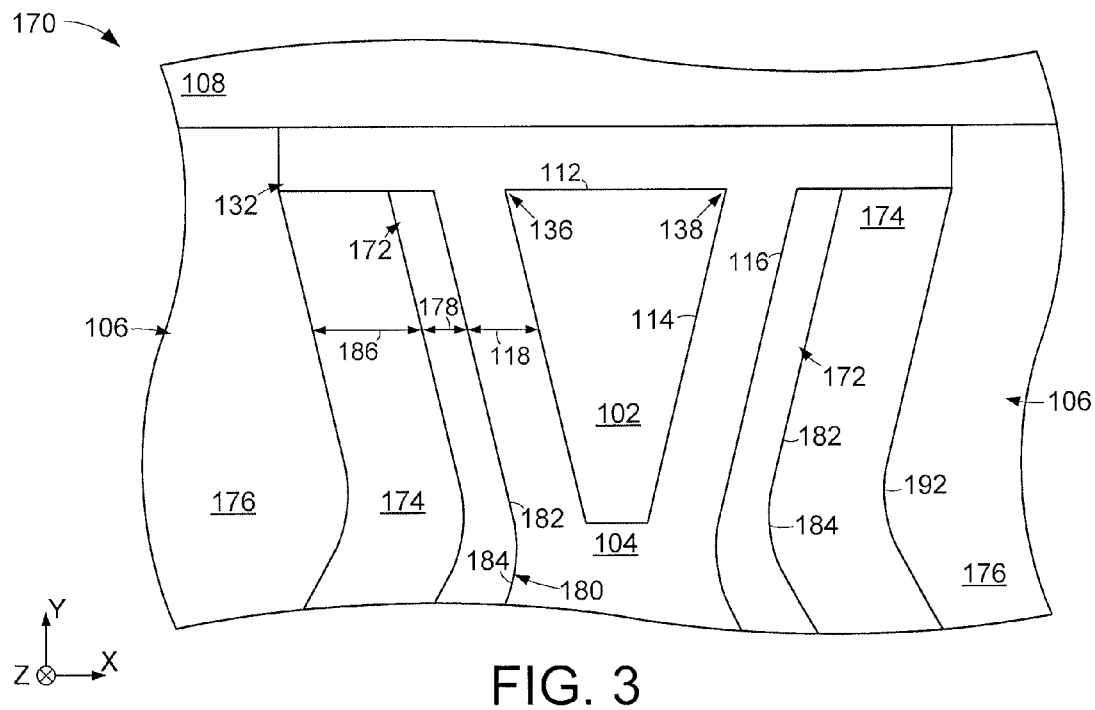
FIG. 3 displays an air bearing line representations of a portion of an example data writer arranged in accordance with assorted embodiments.

FIG. 3 illustrates an air bearing view line representation of a portion of an example data writer 170 that configures the side shields 106 with more than two graded magnetic moment sub-layers in accordance with some embodiments. As shown, the side shields 106 each are configured with first 172, second 174, and third 176 sub-layers. It is noted that any number of side shield sub-layers and materials can be utilized without limitation.

The first shield sub-layer 172 continuously extends from the letterbox notch 132, proximal the write pole 102, in contact with the gap material 104 with at least a first cross-track width 178, as measured along the X axis. The first cross-track width 178 may provide a uniform separation distance between the gap material 104 and the second sub-layer 174 from the pole corners 138 and 140 to a shield feature 180 uptrack from the pole tip 110. The shield feature 180 is defined by a transition from a linear side shield sidewall 182 to a continuously curvilinear sidewall 184 that slopes away from the write pole 102 along the X axis.

The first cross-track width 178 of the first shield sub-layer 172 can be smaller than a second cross-track width 186 of the second shield sub-layer 174 to provide a predetermined amount of low magnetic moment material close to the write pole. That is, the cross-track widths 178 and 186 can be respectively tuned relative to the magnetic moments of the first 172 and second 174 shield sub-layers to increase write pole 102 write field and gradient while reducing erasure fields and ATI risk. It is noted that the first 172 and second 174 shield sub-layers each continuously extend from the letterbox notch 132 to a plane uptrack from the pole tip 110 with an interlayer seam consisting of the linear 182 and curvilinear 184 sidewalls that respectively present seam features 188 and 190 offset from one another along the Y axis in the downtrack direction.

The tuned configuration of the first 172 and second 174 shield sub-layers can be complemented by the third shield sub-layer 176 that has a greater magnetic moment than the other sub-layers 172 and 174 while continuously extending from the front shield 108 to a plane uptrack from the pole tip 110. The third shield sub-layer 176 is separated from the second sub-layer 174 by a sub-layer seam 192 and extends beyond the cross-track width 136 of the letterbox notch 132, which allows the higher magnetic moment of the third shield sub-layer 176 to be coupled to the front shield 108 and increases the ability of the collective shields of the data writer 170 to dissipate stray fields and mitigate the establishment of magnetic domains in the shields.

Figure 4:
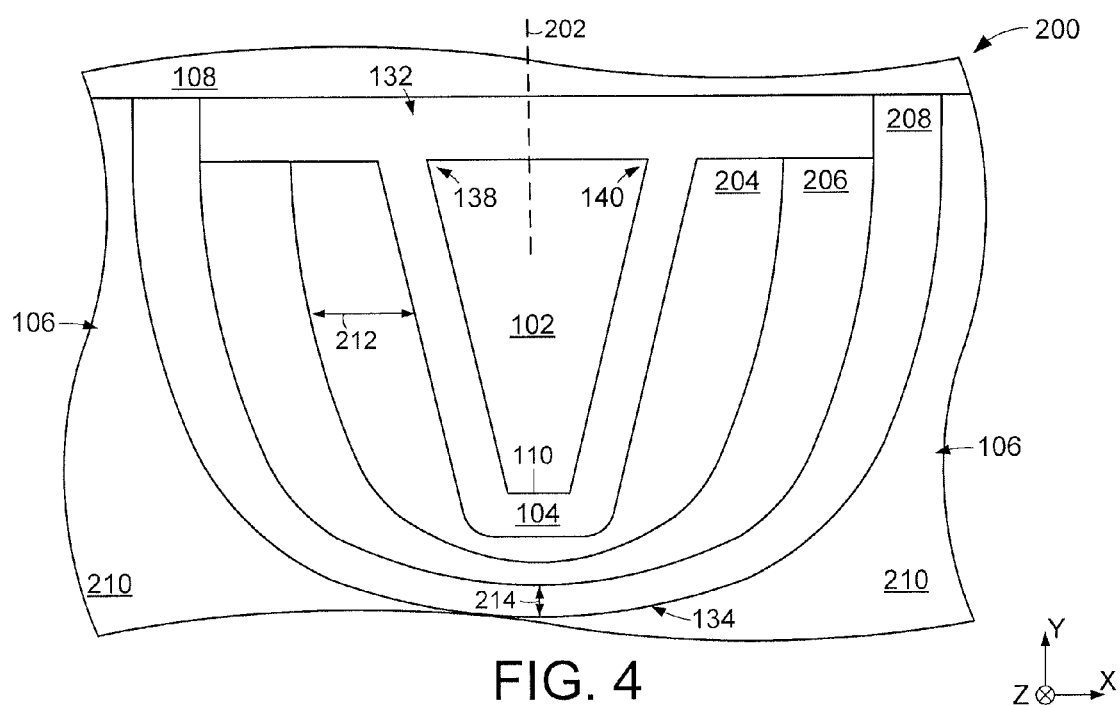
FIG. 4 illustrates an air bearing view line representation of a portion of an example data writer configured in accordance with various embodiments.

FIG. 4 is an air bearing view line representation of a portion of an example data writer 200 configured with a shielding structure that encircles the write pole 102 in accordance with assorted embodiments. The data writer 200 configures the respective left and right side shields 106 to continuously extend uptrack and around the pole tip 110 to form a box, or wrap-around, shield. It is contemplated that the box shield positions magnetic shielding material immediately uptrack from the pole tip 110 along a longitudinal axis 202 that bisects the write pole on an air bearing surface (ABS).

The longitudinal axis 202 can operationally be aligned with a centreline of a data track discretely stored on a data storage medium. As such, the configurations of the data writer 200 can be symmetric about the longitudinal axis 202 to provide the same shielding of stray fields on opposite cross-track sides of the write pole 102. The combination of the box shield portion of the side shields 106 with the downtrack front shield 108 creates a coupled loop about the write pole 102 that is harder to saturate and generate magnetic domains and domain walls.

While it is contemplated that various sub-layers of the side shields are constructed to not continuously extend around the pole tip 110, various embodiments configure first 204, second 206, third 208, and fourth 210 shield sub-layers to each continuously extend from a first lateral side of the write pole 102 to an opposite second lateral side. Each of the shield sub-layers have thicknesses 212 that vary along the downtrack direction. For clarity, the thickness 212 of a sub-layer is defined as the separation distance of the material. Hence, the first sub-layer 204 has a greater thickness 212 proximal a sidewall 114 of the write pole 102, as measured along the X axis, than a downtrack thickness 214 that is measured along the Y axis. The varying sub-layer thickness 212 is not required and some embodiments provide a uniform thickness from a first write pole corner 138 to a second write pole corner 140.

The thickness 212 of the first shield sub-layer 204 may differ from the thickness of the other shield sub-layers. As a non-limiting example, the thickness of the respective sub-layers can increase relative to the sub-layer's placement relative to the write pole, which would make the first shield sub-layer 204 thinner than the second shield sub-layer 206, the second sub-layer 206 thinner than the third sub-layer 208 and so on. In much the same manner, the downtrack thicknesses 214 of the respective shield sub-layers can differ to tune the shielding characteristics downtrack from the write pole 102.

It is noted that each shield sub-layer is separated by a continuously curvilinear seam 216, but such configuration is not required as any number of linear or curvilinear surfaces can make up a seam 216 that defines the contact surface between sub-layers. The shape and size of the respective sub-layers can be chosen to position materials with different magnetic moments is strategic positions relative to the write pole 102. In other words, the positioning of a lower magnetic moment material, such as 0.1 T, as the first shield sub-layer 204 with the second 206, third 208, and fourth 210 shield sub-layers each having progressively greater magnetic moments, such as 0.4 T, 0.8 T, and 1 T, can control how magnetization travels through the side shields 106.

The continuous extension of the first 204 and second 206 shield sub-layers uptrack from the letterbox notch 132 while the third 208 and fourth 210 shields sub-layers are laterally adjacent the letterbox notch 132 illustrates how materials with different magnetic moments can be positioned to optimize the flow of magnetic flux from the write pole. The continuous extension of the respective sub-layers around the pole tip 110 allows downtrack and cross-track encountered stray fields to be collectively dissipated, which differs from the non-contacting side shields 106 shown in FIGS. 2 & 3. By providing low magnetic moment material proximal the write pole and relatively large magnetic moment material distal the write pole 102, the data writer 200 can be sufficiently shielded with high write field amplitude and gradient along with mitigated risk of erasure and ATI conditions.

Figure 5:
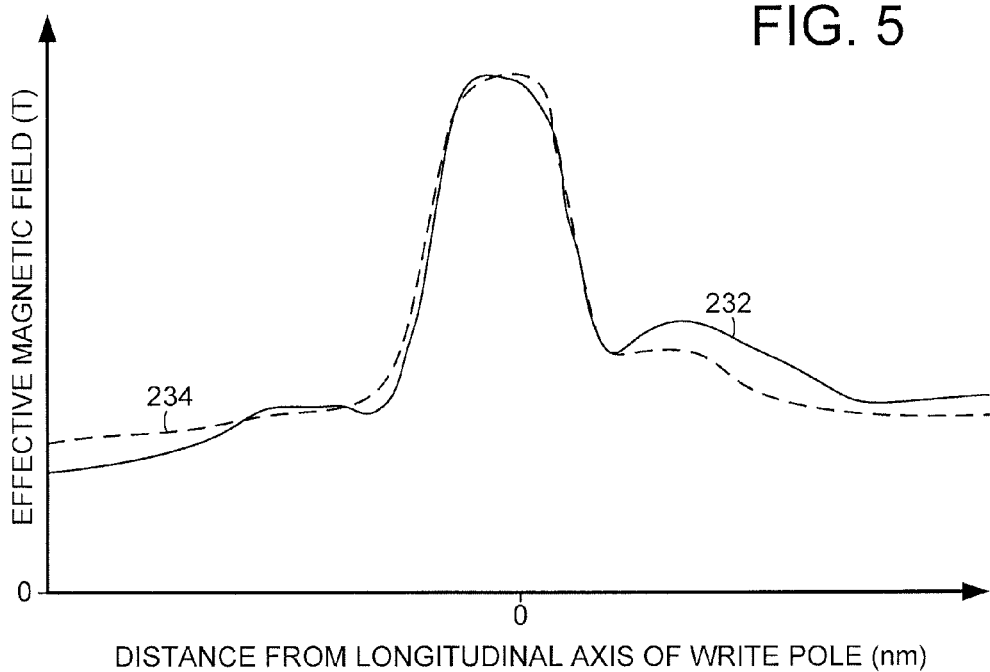
FIG. 5 plots operational data for example data writers constructed and operated in accordance with some embodiments.

FIG. 5 plots operational data associated with an example data writer constructed with at least one side shield with graded magnetic moments in accordance with the embodiments shown in FIGS. 2-4. Solid line 232 represents a baseline data writer configured with side shields each having a single magnetic moment, which may be similar to the side shield 106 configuration of FIG. 1. Segmented line 234 represents an example data writer with graded side shields each having multiple magnetic moments.

As shown, the graded magnetic moments of line 234 control the transmission of magnetic fields distal the longitudinal axis of the write pole compared to a single magnetic moment side shield. Such reduced cross-track magnetic field corresponds with decreased risk of erasure conditions and ATI while providing approximately the same write field amplitude as the single magnetic moment side shield proximal the write pole longitudinal axis. Hence, positioning side shield sub-layers with different magnetic moments to provide a gradual increase in magnetic moment when moving away from a write pole can maintain high data writer writeability and mitigate unwanted cross-track magnetic field transmission.

Figure 6:
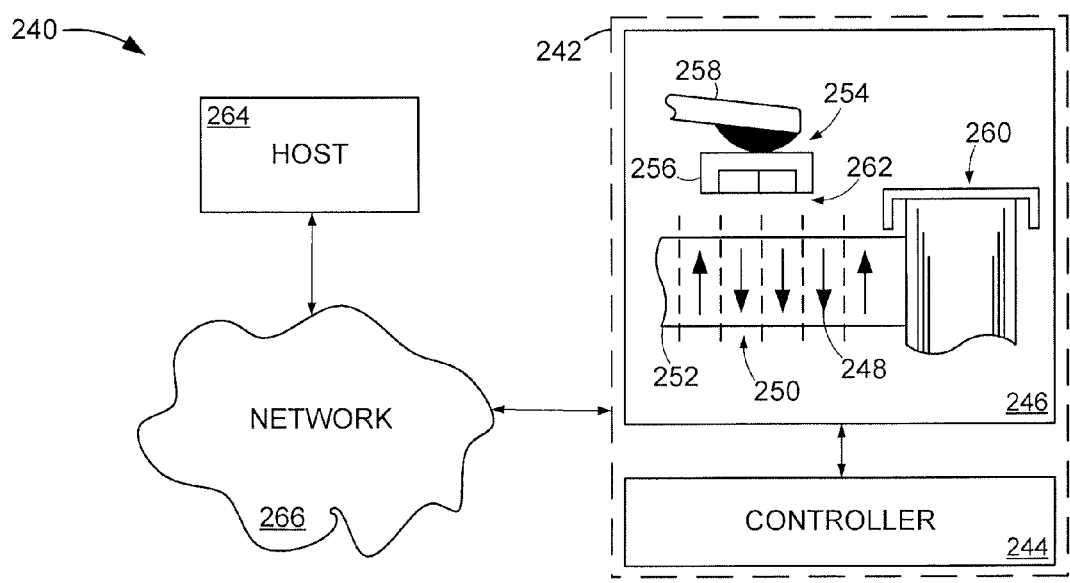
FIG. 6 is a block representation of an example data storage system in which a data writer may be employed in accordance with assorted embodiments.

Although a data writer can be implemented in a variety of different data storage device, assorted embodiments construct the example data storage system 240 as shown in FIG. 6 to employ at least one data writer. Although not required or limiting, the data storage system 240 can have one or more data storage devices 242 that are configured with at least one data storage means. It is contemplated that various solid-state volatile and non-volatile memories can be used as data storage means.

Assorted embodiments arrange at least one data storage device 242 of the data storage system 240 as a hard disk drive with at least one local controller 244 directing operations of a transducing assembly 246 that consists of a plurality of data bits 248 stored in various data track 250 portions of a data storage medium 252. One or more data bits 248 can be accessed individually, concurrently, and successively by a read head 254 that has a slider 256 suspended from an actuating assembly 258 to present data reader and data writer components. In operation, a spindle 260 can rotate the data storage medium 252 to produce an air bearing 262 on which the slider 186 flies, as directed by the actuating assembly 258 and controller 244.

While the data storage device 242 can operate solely with the local controller 244, various embodiments connect the data storage device 242 with at least one remote host 264 via a wired and/or wireless network 266. The remote connection of the data storage device 242 allows the remote host 264 to provide additional processing, data storage, and security capabilities without impinging on the operation of the data storage device 242. It is contemplated that the data storage system 240 can incorporated any number of data readers and data writers, such as in a two dimensional data storage environment.

Figure 7A:
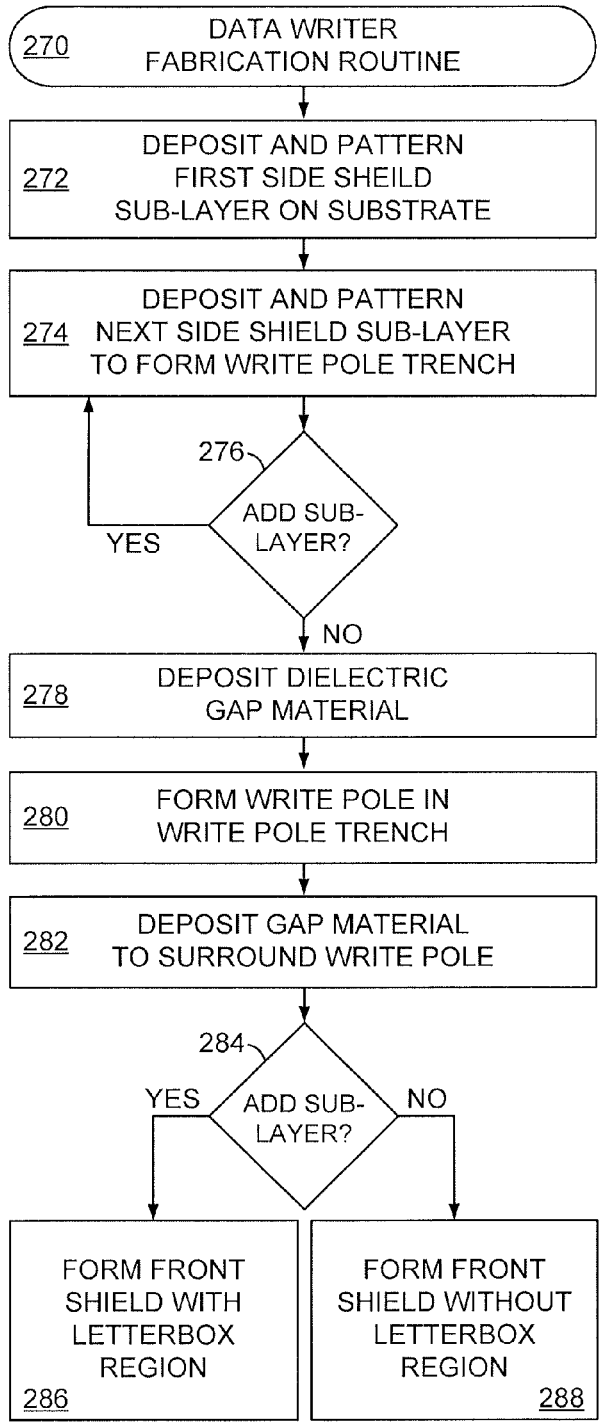
FIGS. 7A and 7B respectively provide a flowchart and representative illustrations of an example data writer fabrication routine that may be conducted in accordance with various embodiments.
Figure 7B:
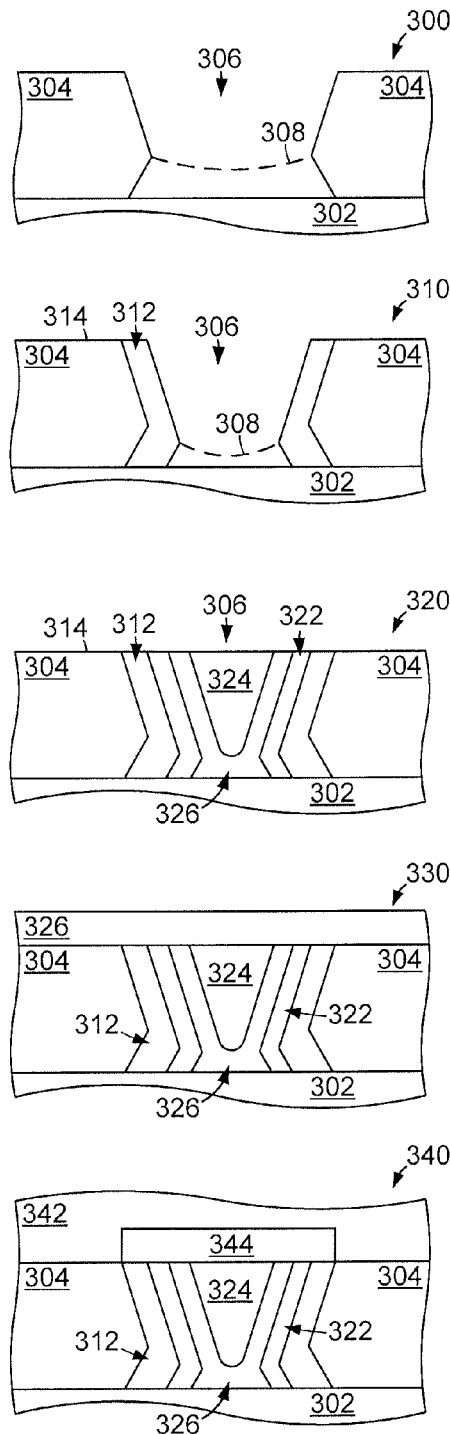

FIGS. 7A and 7B respectively convey an example data writer fabrication routine 270 along with representative illustrations. The routine 270 begins with step 272 depositing and subsequently patterning a first side shield sub-layer onto a substrate. Example writer 300 of FIG. 7B illustrates how a substrate 302 supports a first shield sub-layer 304 that is patterned to provide a write pole trench 306. It is noted that the write pole trench 306 may continuously extend to the substrate 302 or may define a wrap-around box shield, as shown by segmented line 308.

Step 274 proceeds to deposit and subsequently pattern a second side shield sub-layer atop the first side shield side layer with a lower magnetic moment than the first side shield sub-layer. The example data reader 310 shows how the second side shield sub-layer 312 is patterned to provide a planar top surface 314 while continuously extending along the entirety of the first side shield sub-layer sidewall. A data writer may be configured with only two side shield sub-layers. Decision 276 evaluates if any additional side shield sub-layers are to be formed to increase the number of different shield magnetic moments. If another side shield sub-layer is chosen, step 274 is again executed to form an additional side shield sub-layer with a lower magnetic moment than the existing sub-layers.

When decision 276 determines that no more sub-layers are to be formed, routine 270 advances to step 278 where at least one dielectric material is deposited and subsequently patterned to define a write pole shape that is filled in step 280 with a magnetic material to form a write pole. The example data writer 320 illustrates how first 304, second 312, and third 322 side shield sub-layers form side shields separated from opposite sides of a write pole 324 by a continuous dielectric gap layer 326. The construction of the write pole in step 280 allows step 282 to surround the write pole with the dielectric gap layer, which is displayed in example data writer 330.

Decision 284 determines if a front shield is to have a letterbox region. In the event a letterbox region is chosen, step 286 forms a front shield atop the side shield and dielectric gap layer with the dielectric material continuously extending beyond the shield sidewall of the closest side shield sub-layer. If no letterbox region is to be constructed from decision 284, step 288 planarizes the top surface of the side shields and forms a front shield of one or more layers. It is noted that the front shield formed in steps 286 or 288 can be one or more magnetic and non-magnetic layers. Example data writer 340 shows how a front shield 342 can be constructed with a varying thickness proximal the write pole 324 to provide a letterbox region 344 with portions of the front shield 342 contacting the side shields.

It is noted that the various aspects of routines 270 are not required or limiting and any portion can be changed and removed just as additional aspects can be incorporated. For example, additional steps can be incorporated into routine 270 that fill the letterbox region out of one or more dielectric layers. As another example, steps can form one or more shield features with multiple surfaces aligned with, or uptrack from, the leading tip of the write pole.

Through the various embodiments of the present disclosure, side shields have graded magnetic moments that increase via different shield sub-layers relative to the sub-layer's distance from the write pole. By placing magnetic shielding material with lower magnetic moment proximal the write pole and shielding material with greater magnetic moment distal the write pole, side shield magnetic saturation is mitigated, which increase the writeability of the data writer while reducing the risk of erasure and ATI conditions. The ability to configure a side shield with any number of different sub-layers with varying magnetic moments allows a data writer to be configured with a tuned balance of magnetic shielding capabilities and risk of unwanted magnetic shunting.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a write pole separated from first and second side shields by a continuous dielectric gap layer along a cross-track direction, the write pole separated from a data storage medium by an air bearing, each side shield having first, second, and third shield sub-layers each positioned to extend no farther downtrack than a trailing edge of the write pole, each continuously extending uptrack from the letterbox region, and each configured with different magnetic moments, the third sub-layer having a greater magnetic moment than the first or second sub-layers, the first and second side shields continuously extending around a leading tip of the write pole.

2. The apparatus of claim 1, wherein each shield sub-layer continuously extends from a first plane to a second plane uptrack of a leading edge of the write pole, the first plane parallel to and aligned with the trailing edge of the write pole along the cross-track direction.

3. The apparatus of claim 1, wherein the first and second side shields are symmetric about a longitudinal axis of the write pole on an air bearing surface.

4. The apparatus of claim 3, wherein the longitudinal axis bisects the write pole and is parallel to a downtrack direction.

5. The apparatus of claim 1, wherein the first sub-layer is positioned between the write pole and the second sub-layer.

6. The apparatus of claim 5, wherein the first sub-layer has a lower magnetic moment than the second sub-layer.

7. The apparatus of claim 1, wherein the first and second sub-layers are each magnetic.

8. The apparatus of claim 1, wherein each side shield comprises a third sub-layer contacting the second sub-layer and positioned distal the write pole.

9. The apparatus of claim 8, wherein the third sub-layer has a greater magnetic moment than first and second sub-layers.

10. The apparatus of claim 8, wherein the third sub-layer has a greater thickness than the first and second sub-layers, the thickness measured perpendicular to a longitudinal axis of the write pole.

11. An apparatus comprising a write pole separated from first and second side shields by a continuous dielectric gap layer along a cross-track direction, the write pole separated from a data storage medium by an air bearing, each side shield having first, second, and third shield sub-layers each configured with different magnetic moments, the third sub-layer having a greater magnetic moment than the first or second sub-layers and separated from the write pole by the first and second sub-layers, the first and second side shields continuously extending around a leading tip of the write pole.

12. The apparatus of claim 11, wherein a letterbox region is positioned downtrack from a trailing edge of the write pole, the letterbox region filled with the continuous dielectric gap layer.

13. The apparatus of claim 12, wherein each sub-layer continuously extends uptrack from the letterbox region.

14. The apparatus of claim 12, wherein first and second uptrack surfaces of the letterbox region are each aligned in a common plane with the trailing edge on an air bearing surface.

15. The apparatus of claim 12, wherein the letterbox region has a width that is greater than a collective width of the trailing edge and the continuous dielectric gap layer.

16. The apparatus of claim 11, wherein each sub-layer continuously extends from a first side of the write pole around the leading tip to a second side of the write pole, the first and second sides being opposite lateral sides along a cross-track direction.

17. The apparatus of claim 11, wherein the sub-layers are configured with smaller magnetic moment material proximal the write pole and greater magnetic moment material distal the write pole.

18. The apparatus of claim 11, wherein the first sub-layer of each side shield is a first single continuous film, the second sub-layer of each side shield is a second single continuous film.

19. A method comprising:
    forming a first side shield sub-layer on a first side of a write pole;

depositing a second side shield sub-layer in contact with the first side shield sub-layer, the second side shield sub-layer having a lower magnetic moment than the first side shield sub-layer;

creating a third side shield sub-layer contacting the second side shield sub-layer and having a lower magnetic moment than the first or second side shield sub-layers, third sub-layer separated from the write pole by the first and second sub-layers;

form a continuous dielectric gap layer in contact with the second side shield sub-layer;

deposit a magnetic write pole on the continuous dielectric gap layer, the magnetic write pole separated from the second side shield sub-layer by the continuous dielectric gap layer.

* * * * *